US009315339B2

(12) United States Patent
Gaillard et al.

(10) Patent No.: US 9,315,339 B2
(45) Date of Patent: Apr. 19, 2016

(54) BATCH CONVEYING UNIT FOR A UNIT FOR CONVERTING PLATE-LIKE ELEMENTS IN A PACKAGING PRODUCTION LINE

(71) Applicants: Olivier Gaillard, Suchy (CH);
Jean-Jacques Lucas, Savignac (FR)

(72) Inventors: Olivier Gaillard, Suchy (CH);
Jean-Jacques Lucas, Savignac (FR)

(73) Assignee: BOBST MEX SA (CH)

( * ) Notice: Subject to any disclaimer, the term of this patent is extended or adjusted under 35 U.S.C. 154(b) by 0 days.

(21) Appl. No.: 14/362,170

(22) PCT Filed: Nov. 1, 2012

(86) PCT No.: PCT/EP2012/004561
§ 371 (c)(1),
(2) Date: Jun. 2, 2014

(87) PCT Pub. No.: WO2013/079144
PCT Pub. Date: Jun. 6, 2013

(65) Prior Publication Data
US 2014/0346011 A1    Nov. 27, 2014

(30) Foreign Application Priority Data

Dec. 1, 2011  (EP) .................................... 11009509

(51) Int. Cl.
| B65G 47/46 | (2006.01) |
| B65G 47/30 | (2006.01) |
| B65G 23/26 | (2006.01) |
| B65G 47/68 | (2006.01) |
| B65G 15/10 | (2006.01) |
| B26D 7/32  | (2006.01) |
| B65G 47/34 | (2006.01) |

(52) U.S. Cl.
CPC ........ *B65G 47/30* (2013.01); *B26D 7/32* (2013.01); *B65G 15/105* (2013.01); *B65G 23/26* (2013.01); *B65G 47/34* (2013.01); *B65G 47/682* (2013.01)

(58) Field of Classification Search
CPC ................... B65H 2220/02; B65H 2301/4473; B65G 47/52; B65G 47/53; B65G 47/64; B65G 47/06; B65G 47/082

USPC .......... 198/457.03, 433, 418.7, 369.1, 369.7, 198/432
See application file for complete search history.

(56) References Cited

U.S. PATENT DOCUMENTS

| 5,421,446 A * | 6/1995 | Koch et al. ................. 198/369.7 |
| 6,152,284 A * | 11/2000 | Sandberg et al. ............. 198/432 |
| 7,717,251 B2 * | 5/2010 | Glas .............................. 198/448 |
| 8,167,120 B2 * | 5/2012 | Russell et al. ................ 198/809 |
| 2007/0272514 A1 * | 11/2007 | Hamers et al. ............ 198/369.7 |
| 2010/0072026 A1 * | 3/2010 | Russell et al. ............. 198/369.1 |

FOREIGN PATENT DOCUMENTS

| DE | 10 2008 023 321 A1 | 11/2009 |
| EP | 0 509 153 A1 | 10/1992 |
| EP | 1 369 213 A2 | 12/2003 |
| EP | 2 380 830 A1 | 10/2011 |

OTHER PUBLICATIONS

International Search Report dated Jan. 22, 2013 issued in corresponding International application No. PCT/EP2012/004561.

* cited by examiner

Primary Examiner — James R Bidwell
(74) Attorney, Agent, or Firm — Ostrolenk Faber LLP

(57) ABSTRACT

A batch conveying unit for a unit for conveying plate-like elements has at least two transport devices adjacent and parallel to one another (13, 14, 16) which are capable of transporting (L) the batches (3, 6) in a longitudinal direction, drive devices for the transport devices (13), and an actuating device for coupling and decoupling a second transport device (14, 28) relative to a first transport device (14, 27), so as to transport (L) a first batch (6) of elements with the first transport device (14, 27) in the longitudinal direction and to leave a second batch (7) of plate-like elements with the second transport device (14, 28) substantially immobile longitudinally when the second transport device (14, 28) is decoupled from the first transport device (14, 27).

13 Claims, 4 Drawing Sheets

BATCH CONVEYING UNIT FOR A UNIT FOR CONVERTING PLATE-LIKE ELEMENTS IN A PACKAGING PRODUCTION LINE

CROSS-REFERENCE TO RELATED APPLICATIONS

The present application is a 35 U.S.C. §§371 national phase conversion of PCT/EP2012/004561, filed Nov. 1, 2012, which claims priority of European Patent Application No. 11009509.8, filed Dec. 1, 2011, the contents of which are incorporated by reference herein. The PCT International Application was published in the French language.

FIELD OF THE INVENTION

The present invention relates to a packaging conveying unit intended for a unit for converting a plate-like element. The invention also relates to a unit for converting a plate-like element, comprising a unit conveying the batches in a packaging production line.

BACKGROUND OF THE INVENTION

A packaging production line is intended for the manufacture of folding boxes which will form the packaging after being folded and glued in a folding-gluing machine. Elements which are initially in plate form, such as cardboard sheets, for example made of corrugated cardboard, have very often been previously printed on by a printing machine so as to ensure the attractive appearance of the final packaging.

A conversion unit such as a cutting unit, for example a platen cutting press, is installed downstream of the printing machine. The plate-like elements are introduced via a feeding station mounted upstream of the cutting unit. After cutting and stripping the wastes, the boxes obtained are ready for use and emerge in the form of stacks or batches. Said batches are collected at the outlet of the unit in a delivery station installed downstream.

According to the dimensions of the desired boxes, the plate-like elements may leave the cutter in the form of blanks. The blanks are composed of several juxtaposed boxes, attached together by nicks. The nicks connect two edges of a cutting line between two boxes and constitute bridges of the same material as the boxes and the blanks. The blanks are then introduced into a separating unit or breaker, for example similar to that disclosed in the document EP 1,369,213, breaking the nicks, so as to obtain the separate boxes. After separation, the boxes which have been obtained are ready for use and emerge in the form of juxtaposed batches. Said batches are collected at the outlet of the separator in the delivery station provided downstream.

PRIOR ART

The batches often have to be conveyed from one point to another in the production line, either subsequently to feed the folding-gluing machine, or to be placed on pallets, or to be strapped or packed before delivery. Most often, an operator intervenes to transport manually or to push the desired batches onto conveyors. Motorized belt-type or roller-type conveyors are also used to carry out this conveying operation.

SUMMARY OF THE INVENTION

A principal object of the present invention consists in developing a conveying unit making it possible to improve the transport of batches arriving at the outlet of the conversion unit. A second object is to produce a conveying unit which is adaptable to all types of dimensions of batches. A third object is to provide a unit conveying the batches, permitting the drawbacks of the systems of the prior art to be avoided. A further object is that of providing a conveying unit for a unit for converting plate-like elements.

According to a feature of the present invention, a batch conveying unit firstly comprises at least two transport means, a first transport means and a second transport means. The first transport means and the second transport means are adjacent and parallel to one another. The first transport means and the second transport means are capable of transporting the batches in the longitudinal direction.

The batch conveying unit thus comprises drive means serving to drive the transport means for transporting the batches in the longitudinal direction. The batch conveying unit finally comprises actuating means. The actuating means are capable of coupling, and conversely decoupling, a second transport means, forming part of the transport means, relative to a first transport means, forming part of the transport means. In this manner, the conveying unit transports a first batch with the first transport means in the longitudinal direction and leaves a second batch with the second transport means substantially immobile longitudinally when the second transport means is decoupled from the first transport means.

A batch is defined as being an individual batch or a set of several batches. A batch is defined as being formed from stacked or juxtaposed flat elements. A batch consists of plate-like elements, sheets, blanks, folding box blanks, or the like, in particular emerging from the conversion unit and the packaging production line. The flat elements, more specifically for the packaging, are made of a material such as paper, flat cardboard, corrugated cardboard, flexible plastics or the like.

In other words, the unit ensures the displacement of a first batch relative to a further second batch. The second batch remains immobile on its second transport means, whilst the first batch is transported by its first transport means. The second batch does not move, as the second transport means is decoupled from the first transport means.

The actuating means permit the second transport means to be decoupled from the first transport means and thus from the drive means. When the second transport means is decoupled from the first transport means, only the first transport means remains driven. The second batch may be processed further down the packaging production line. The conveyor of the invention makes it possible to control separately the displacement of numerous batches. First sets of batches are displaced successively whilst second sets of batches remain immobile.

In a further feature of the invention, a unit for converting plate-like elements, such as a cutting unit provided with a receiving station in a packaging production line, is characterized in that it comprises a batch conveying unit, having one or more of the technical features disclosed below and claimed. The conveying unit is positioned downstream of the receiving station.

The longitudinal direction is defined by referring to the direction of travel or the driving direction of the batches in the unit and also in the conversion unit and possibly in the packaging production line along the longitudinal median axis thereof. The transverse direction is defined as being the direction perpendicular to the direction of travel of the batches. The upstream and downstream positions are defined relative to the longitudinal direction and to the running direction from the inlet of the unit as far as the outlet of the unit.

BRIEF DESCRIPTION OF THE DRAWINGS

The invention will be clearly understood and the various advantages and different features thereof will emerge more clearly from the following description of the non-limiting exemplary embodiment, with reference to the accompanying schematic drawings, in which.

DETAILED DESCRIPTION OF THE PREFERRED EMBODIMENTS

Figure 1:
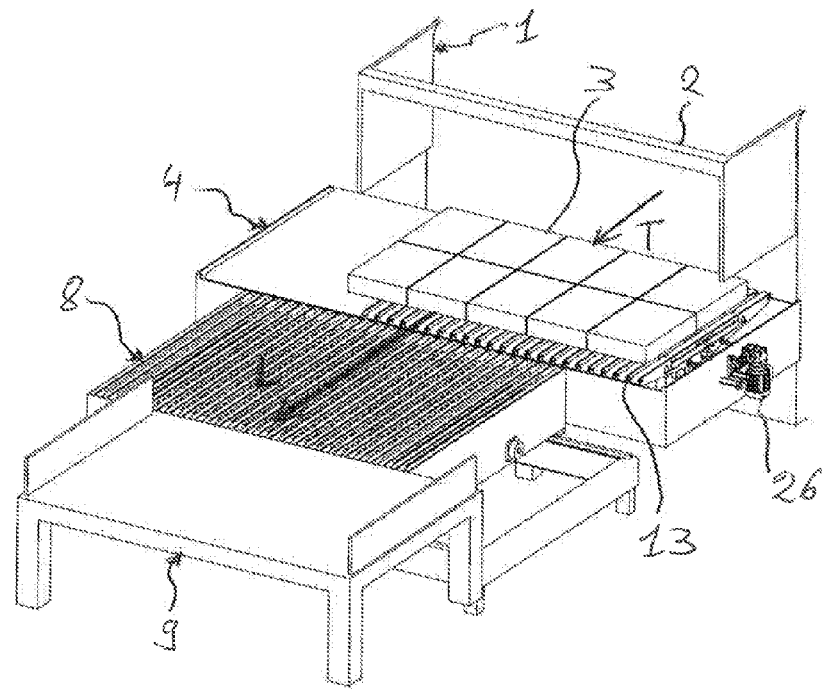
FIG. 1 shows a partial perspective view of a conversion unit with a conveying unit according to the invention.
Figure 2:
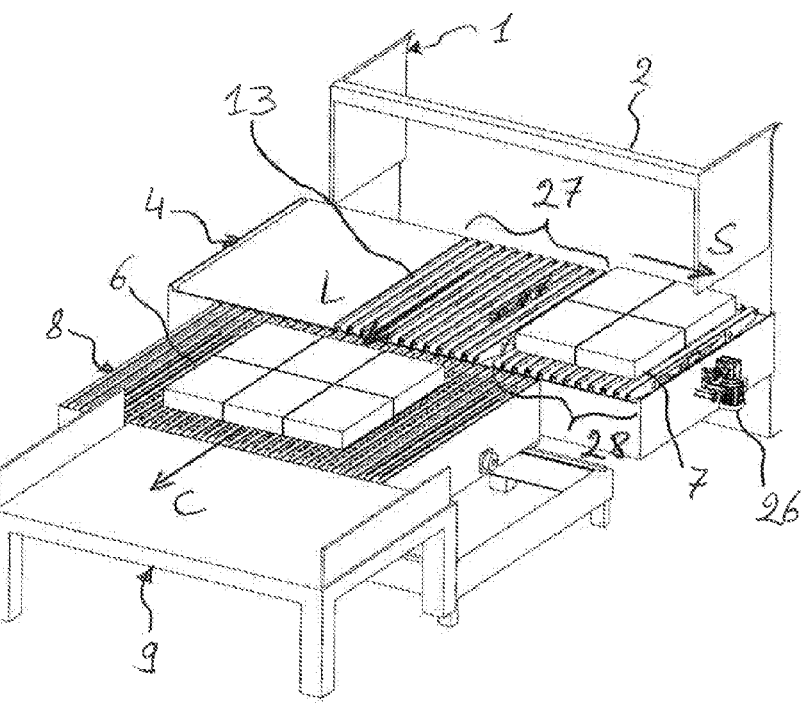
FIG. 2 shows a partial perspective view of the conversion unit with the conveying unit of FIG. 1, showing transported batches.

A production line for packaging in the form of cardboard boxes comprises a conversion unit, such as a platen cutting press. As FIGS. 1 and 2 illustrate, a separating unit 1 is mounted downstream of the press. The separating unit 1 comprises a delivery station 2. Boxes leave the delivery station 2 in the form of batches or stacks 3 in the longitudinal direction via an endless belt conveyor or conveyor belt.

In this example, a plate-like element, i.e. a cardboard sheet, is cut out by the press and transformed into ten juxtaposed boxes. A stack of elements initially in sheet form thus generates ten stacks of juxtaposed boxes 3, arranged in two successive rows of five stacks. All the stacks 3 are moved longitudinally (arrow T in FIG. 1) on a conveying unit 4 mounted downstream of the delivery station 2.

The conveying unit 4 implements a management of the stacks 3. As shown in FIG. 2 by way of example, one option for managing the ten stacks 3 consists for example in moving six stacks 6 forward longitudinally (arrows L in FIGS. 1 and 2), whilst leaving four stacks immobile 7. The six mobile stacks 6 are moved by the conveying unit 4 toward and onto a second conveying table 8. The six mobile stacks 6 are then moved longitudinally (arrow C in FIG. 2) via the conveying table 8 toward and onto a receiving table 9 to be processed immediately downstream in the remainder of the packaging production line (not shown).

It is only once the six mobile stacks 6 have been discharged C further down the packaging production line that the four immobile stacks 7 are, for example, moved by the conveying unit 4 toward and onto the second conveying table 8, then toward and onto the receiving table 9 and finally further down the packaging production line.

These separate sequences of the conveying operation may be implemented according to the programming effected by the operator of the platen cutting press and the separating unit 1, according to the different box formats, the number of stacks to be processed initially and the number of stacks to be processed subsequently, etc.

Figure 3:
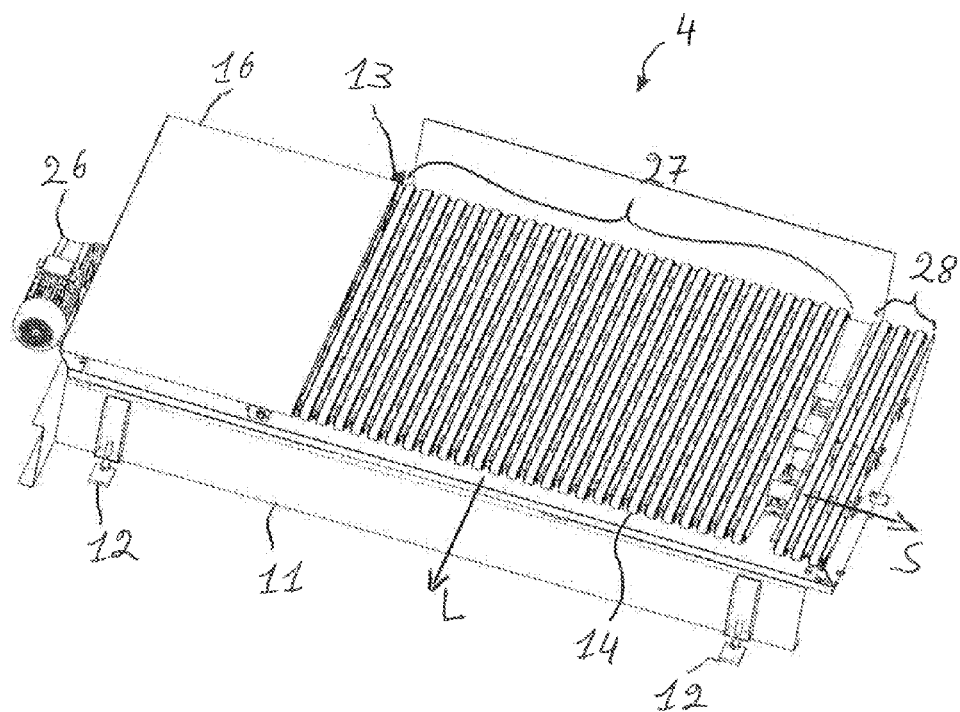
FIG. 3 shows a perspective view of the conveying unit.

The conveying unit 4 comprises (see FIG. 3) a frame 11 mounted on feet 12. The conveying unit 4 comprises thirty transport means 13 forming a substantially horizontal surface for retaining and transferring stacks 3, 6, 7 and located in the upper part of the frame 11.

The transport means 13 are advantageously formed by conveying ramps 14 having endless belts 15, in this case twenty-nine in number. The transport means 13 are also formed by an endless conveyor belt 16 located in the region of one of the lateral sides of the frame 11 and the conveying unit 4. The belts 15 and thus the ramps 14 are all identical, arranged successively alongside, adjacent and parallel to one another. The conveyor belt 16 is parallel to the belts 15. The belts 15 and the conveyor belt 16 travel longitudinally (arrows B in FIGS. 4 and 5) and are capable of transporting the batches 3, 6 and 7 in the longitudinal direction L.

The transport means 13, ramps 14 and conveyor belt 16 comprise an upstream return pulley 17, a downstream return pulley 18, a principal lower drive arrangement 19 and two retention pulleys 21 flattening the belt 15 against the drive arrangement 19. The return pulleys 17, 18 and 21 may also be replaced by pinions. The upstream return pulley 17 and the downstream return pulley 18 hold the belt 15 horizontally, so as to form the upper retaining and transfer surface for the batches 3, 6 and 7. The transport means 13, ramps 14 and conveyor belt 16 comprise a retaining structure 22 to which the return pulleys 17, 18 and 21 and the drive arrangement 19 are fixed.

The drive arrangement 19 permits the travel B of the belt 15 and permits the transport in the longitudinal direction L. In a first embodiment (see FIG. 4) the drive arrangement 19 is formed by a drive pulley 23 driving the belt 15. In a second embodiment (see FIG. 5) the drive arrangement 19 is formed by a drive pinion 24 driving the belt 15.

The conveying unit 4 comprises drive means of the electric motor type 26, driving (arrow R in FIGS. 4 and 5) the drive arrangement 19 in rotation, which causes the belts 15 to travel B. The motor 26 is fixed to the frame 11, in the region of the lateral side located in the vicinity of the conveyor belt 16.

The conveying unit 4 transports a first batch in the longitudinal direction L, i.e. the mobile stacks 6 with the first transport means. The mobile stacks 6 are thus placed on and transported by a first series 27 of ramps 14. The conveying unit 4 leaves a second batch immobile, i.e. the immobile stacks 7 with the second transport means. The immobile stacks 7 are thus placed on and transportable by a second series 28 of ramps 14. The ramp(s) of the first series 27 and the ramp(s) of the second series 28 are adjacent to one another.

The number of ramps 14 of the first series 27 and the second series 28 is variable, as a function of the width of the transported stacks 6 or immobile stacks 7. The number of ramps 14 of the first series 27 may be equal to zero and the number of ramps 14 of the second series 28 may be equal to twenty-nine, in the case where only the conveyor belt 16 transports one or more stacks 6. In contrast, the number of ramps 14 of the first series 27 may be equal to twenty-nine and the number of ramps 14 of the second series 28 may be equal to zero, in the case where all of the stacks 3 have to be transported.

All of the intermediate variations for the ramps 14 of the first series 27 and the ramps 14 of the second series 28 are possible, depending on the stacks 6 and 7 and what the operator wishes to do with the stacks. In an advantageous manner, only the conveyor belt 16 remains laterally fixed in the region of the lateral side of the conveying unit 4.

To interrupt the transportation L, the second series 28 of ramps 14 is decoupled from the first series 27 of ramps 14. As a result, the second series 28 is no longer driven by the motor 26 and the corresponding belts 15 thereof no longer travel longitudinally. Conversely, the second series 28 of ramps 14 is able to be coupled again to the first series 27 of ramps 14.

According to the invention, the conveying unit 4 comprises actuating means leaving the ramps 14 of the second series 28, with their immobile stacks 7, immobile relative to the ramps 14 of the first series 27 with their stacks 6.

The actuating means firstly preferably comprise coupling means mounted on a ramp 14 of the first series 27, which is laterally the furthest away from the motor 26 and the conveyor belt 16 and which still has to be driven. Said means forming a coupling are capable of cooperating with adjoining means forming a coupling mounted on a ramp 14 of the second series 28, which is immediately adjacent and which is the first which does not have to be driven.

Figure 4:
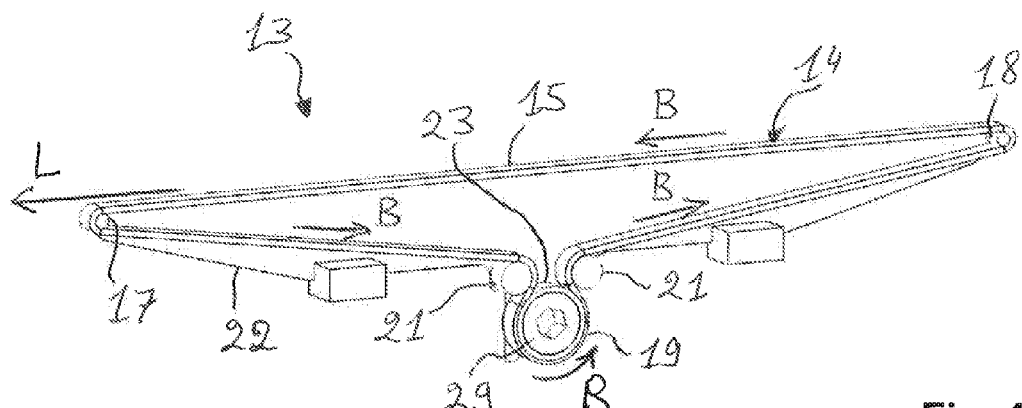
FIG. 4 shows a perspective view of a transport means of the conveying unit according to a first embodiment.
Figure 5:
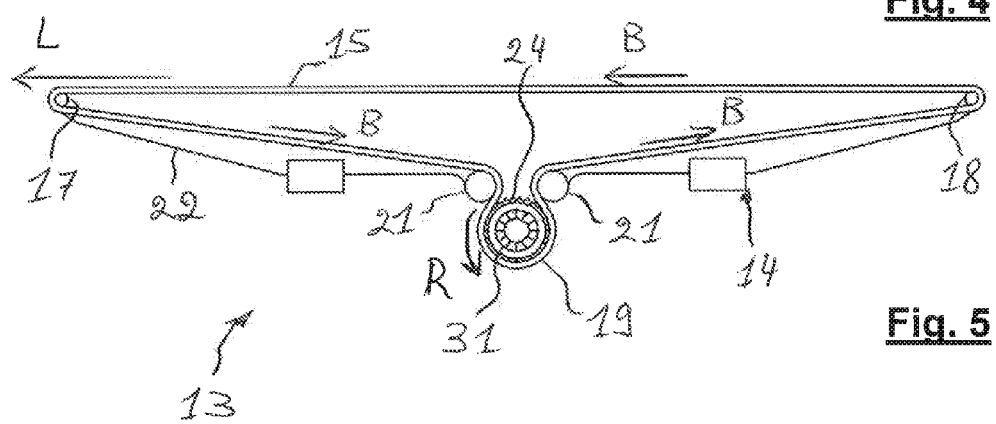
FIG. 5 shows a side view of a transport means of the conveying unit according to a second embodiment.

The coupling means of the first embodiment comprise an electromechanical clutch 29 (see FIG. 4). Said coupling means, i.e. the electromechanical clutch 29, preferably form part of the drive arrangement 19, i.e. of the pulley 23. The surface of the electromechanical clutch 29 is oriented substantially perpendicularly to the axis of rotation of the pulley 23. The position of the electromechanical clutch 29 permits a ramp 14 to be mechanically coupled and decoupled relative to the preceding ramp and the following ramp in the series.

As visible in FIGS. 5 to 9, and advantageously for the second embodiment, the coupling means comprise a dog clutch 31 with laterally oriented teeth 32. Said coupling means, i.e. the dog clutch 31, preferably form part of the drive arrangement 19, i.e. of the drive pinion 24. The teeth of the dog clutch 31 are oriented substantially perpendicular to the teeth of the drive pinion 24. The dog clutch 31 of the ramp 14 has two opposing sets of teeth 32, one set on each of the two faces of the drive pinion 24. The position of the teeth 32 permits a ramp 14 to be mechanically coupled and decoupled relative to the preceding ramp and the following ramp in the series.

In this manner, a ramp 14 or a second series 28 of ramps 14 is decoupled from the last ramp 14 of the first series 27 by disconnecting the clutches 29 of the first embodiment or the respective dog clutches 31 of the second embodiment.

In the first embodiment, the coupling means, i.e. the electromechanical clutch 29 associated with the pulley 23, are mounted on a transverse shaft 33 which drives said coupling means in rotation R. In the second embodiment, the coupling means, i.e. the dog clutches 31 associated with the drive pinion 24, are mounted on a transverse shaft 33 on which they are capable of rotating R. The motor 26 drives in rotation R the drive 24 of the conveyor belt 16 and the rotational movement R is mechanically transmitted to all of the drive arrangements 19 of the first series of ramps 27 via the succession of clutches 29 of the first embodiment or dog clutches 31 of the second embodiment. Said rotational movement R is interrupted by the decoupling of the second series of ramps 28.

The conveying unit 4 provides a lateral offset of the first stack 6 relative to the second stack 7 (visible in FIG. 2). Said offset makes it possible to prevent the two stacks 6 and 7 from remaining together, directly adjacent to one another and in contact. When the first stack 6 starts to be transported by its first series 27 of ramps 14, it does not attach and release the second stack 7.

To obtain this offset, the second series 28 of ramps 14 is capable of being laterally separated (arrow S in FIGS. 2, 3 and 8) from the first series 27 of ramps 14. The separation S of one series 28 of ramps 14 relative to the other series 27 generates a spacing between the displaced stacks 6 and the stacks remaining immobile 7. Conversely, the ramp(s) 14 constituting the second series 28 may be moved laterally toward the ramp(s) 14 constituting the first series 27.

To obtain the separation S, the actuating means preferably comprise separating means, capable of separating and laterally bringing together S the second transport means with the second series 28 of ramps 14 and the first transport means with the first series 27 of ramps 14. In this manner and in the first embodiment, a ramp 14 or a second series 28 of ramps 14 is separated from the second ramp 14 of the first series 27 by decoupling the respective clutches 29 followed by lateral sliding S. In this manner and in the second embodiment, a ramp 14 or a second series 28 of ramps 14 is separated from the last ramp 14 of the first series 27 by lateral sliding S, causing a decoupling of the respective dog clutches 31.

Figure 7:
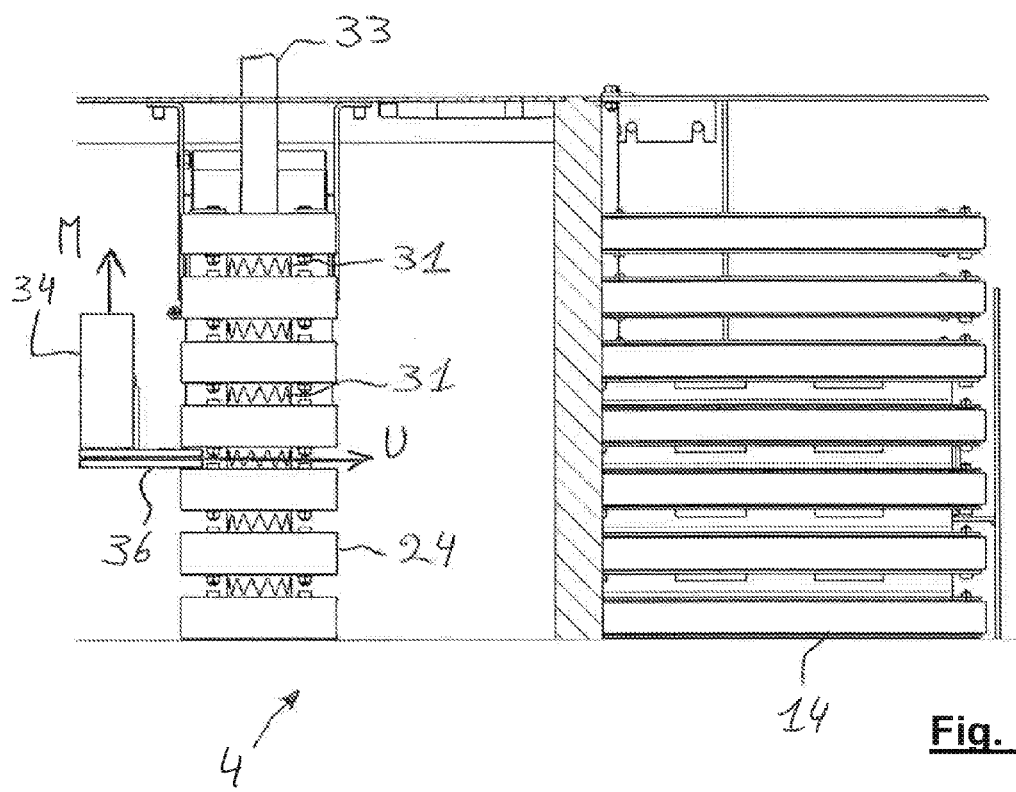
FIGS. 7 to 9 show views from above showing different positions of the actuating means of the conveying unit.
Figure 8:
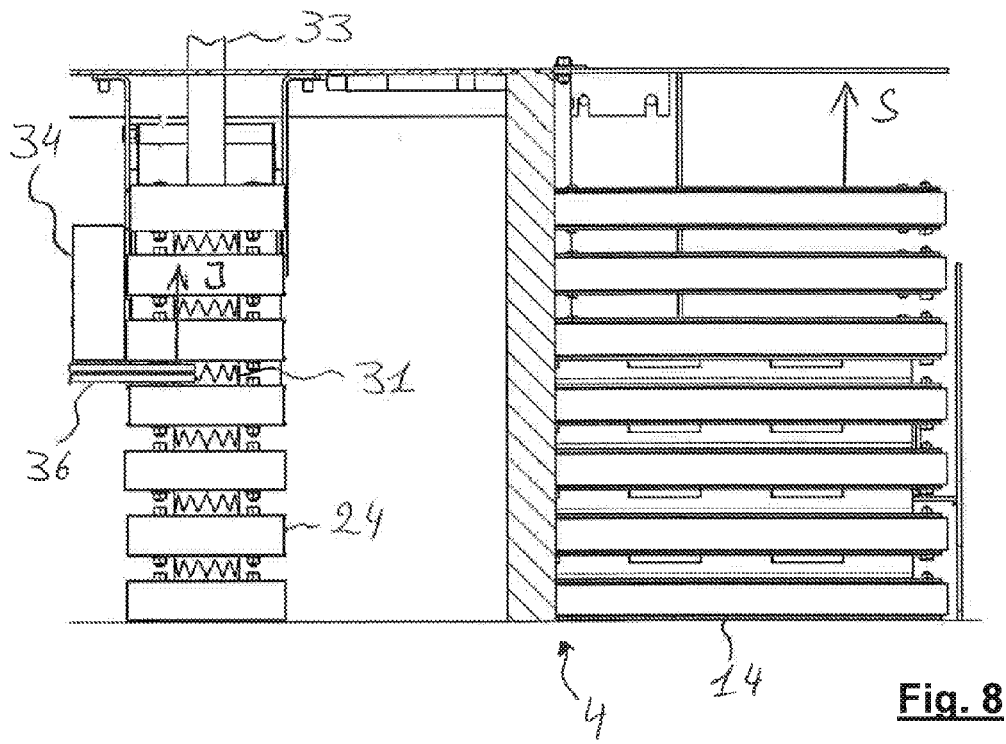
Figure 9:
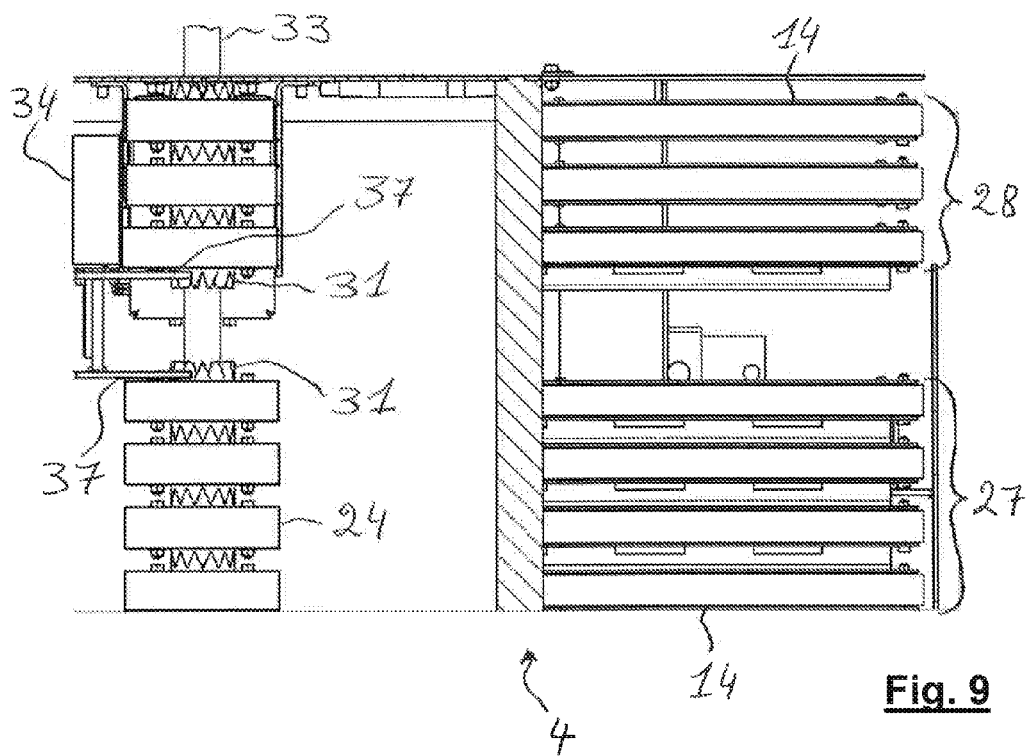

The separating means of the conveying unit 4 advantageously comprise a carriage or mobile element 34. The mobile element 34 is capable of being displaced and positioned in the region of the last ramp 14 of the first series 27 and the first ramp 14 of the second series 28. The mobile element 34 has the function of decoupling and laterally separating S the second series 28 of ramps 14 relative to the first series 27 of ramps 14. FIGS. 7 to 9 show the separating phases between two series 27 and 28 of ramps 14.

To achieve this, the mobile element 34 is capable of being displaced (arrow M in FIG. 7), for example by being slidably mounted on a transverse slide. The slide is parallel to the transverse shaft 33. The mobile element 34 is displaced M, for example using a belt system, driven by a motor.

The mobile element 34 is positioned so as to adopt a lateral position substantially between the first ramp 14 of the second series 28 having to be disconnected and the last ramp of the first series 27 which is connected and driven. The position is determined according to the number of ramps 14 having to be not only detached but also laterally separated S.

The mobile element 34 comprises a separator in the form of a fork 36. The mobile element 34 is displaced longitudinally (arrow U in FIG. 7) so that the fork 36 is inserted longitudinally between two ramps 14. The fork 36 is inserted, for example, in the region of the two drive pinions 24 and the dog clutch 31 thereof. The mobile element 34 is pushed U by a hydraulic cylinder.

The fork 36 advantageously comprises two fingers 37. Each of the two fingers 37 is capable of coming into abutment against the ramps 14 having to be separated, in the region of the two drive pinions 24 and the dog clutch 31 thereof or in the region of the retaining structure 22. The fingers 37 are laterally separated from one another by being pushed back (arrow J in FIG. 8) by a hydraulic cylinder. The separation J of the fingers 37 results in a mechanical decoupling of the dog clutches 31 and to a detachment of the second series 28 of ramps 14 (see FIG. 9).

Figure 6:
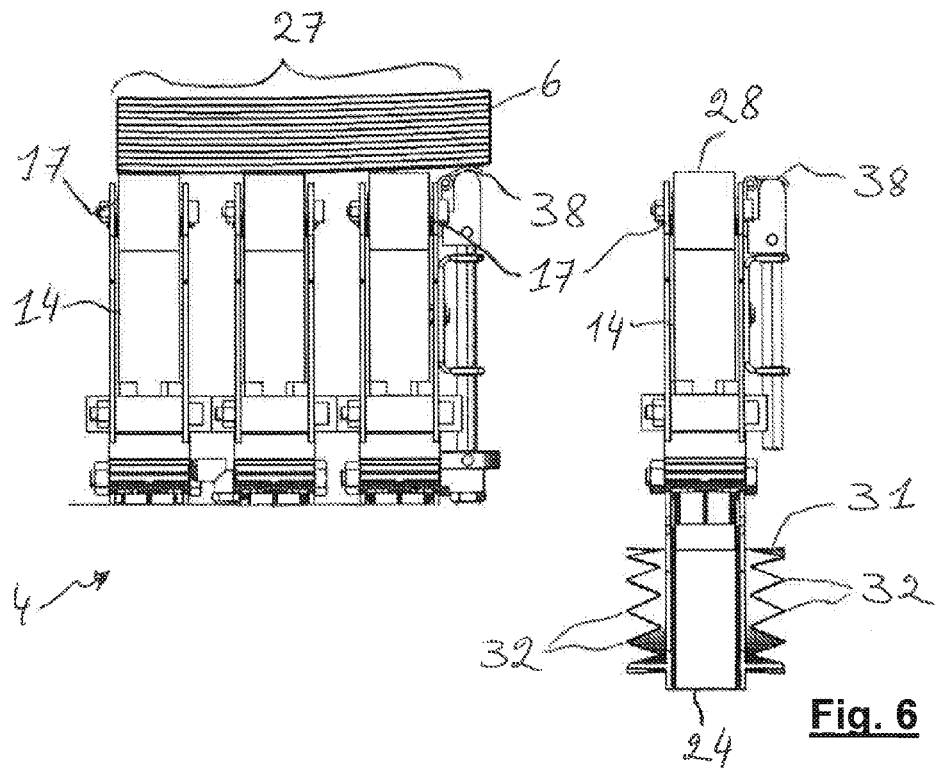
FIG. 6 shows a front partially exploded view of the conveying unit.

The ramps 14 may comprise an element 38 for lifting laterally the transported stack 6, so as to raise and retain the edge of said stack 6 (see FIG. 6). The lifting element 38 is particularly useful when the stack 6 has a width which is greater than the width of several juxtaposed ramps 14, when the addition of a further ramp 14 provides no support for the stack 6.

The present invention is not limited to the embodiments described and illustrated. Numerous modifications may be made without departing from the field of the invention defined by the scope of the set of claims.

The invention claimed is:

1. A batch conveying unit for a unit for converting at least one plate-like element, comprising:
   at least a first and a second transport device adjacent and extending parallel to one another in a longitudinal direction and each of the transport devices being configured for transporting a respective batch of at least one plate like element in the longitudinal direction;
   a drive located and configured for driving the transport devices in the longitudinal direction; and
   an actuating device configured and operable for coupling and decoupling the second transport device relative to the first transport device, the actuating device comprising a first coupling mounted on the first transport device and configured for cooperating with an adjoining second coupling mounted on the second transport device so as to selectively transport first ones of the batches separately from second ones of the batches wherein the first transport device is configured for driving the first ones of the batches in the longitudinal direction and to leave the second ones of the batches which are with the second transport device substantially immobile longitudinally when the second transport device is decoupled from the first transport device.

2. The unit according to claim 1, further comprising at least one third transport device, laterally fixed and positioned in the region of one of the lateral sides of the unit.

3. The unit according to claim 1, wherein the first and second couplings form part of an arrangement to drive the first transport device.

4. The unit according to claim 1, wherein the couplings are mounted for being slid laterally of the unit.

5. The unit according to claim 1, wherein at least one of the couplings comprises a dog clutch with laterally oriented teeth.

6. The unit according to claim 1, wherein each of the transport devices comprises a conveying ramp comprised of an endless moving belt.

7. A unit for converting plate-like elements comprising a cutting unit provided with a receiving station in a packaging production line, and comprising the batch conveying unit as claimed in claim 1, and positioned downstream of the receiving station.

8. A batch conveying unit for a unit for converting at least one plate-like element, comprising:
at least a first and a second transport device adjacent and extending parallel to one another in a longitudinal direction and each of the transport devices being configured for transporting a respective batch of at least one plate like element in the longitudinal direction;
a drive located and configured for driving the transport devices in the longitudinal direction; and
an actuating device configured and operable for coupling and decoupling the second transport device relative to the first transport device so as to selectively transport first ones of the batches separately from second ones of the batches wherein the first transport device is configured for driving the first ones of the batches in the longitudinal direction and to leave the second ones of the batches which are with the second transport device substantially immobile longitudinally when the second transport device is decoupled from the first transport device,
wherein the actuating device comprises a separating device configured and operable for selectively laterally separating and laterally bringing together the second transport device and the first transport device.

9. The unit according to claim 8, wherein the separating device comprises a mobile element which is laterally displaced for decoupling and laterally separating the second transport device relative to the first transport device.

10. The unit according to claim 9, wherein each of the transport devices comprises a respective selected number of individual transport elements, each transport element being operable separately from the other transport elements of the first and the second transport devices; and
the mobile element is mounted and configured for sliding transversely to adopt a selected lateral position, as a function of the number of transport elements that are selectively decoupled and laterally separated.

11. The unit according to claim 10, wherein
the mobile element comprises a separator configured for being inserted longitudinally between two of the transport elements.

12. The unit according to claim 11, wherein the separator comprises two fingers, each finger being located and configured for abutting against a respective transport element and the two fingers are configured for being laterally separated to abut against the respective transport element abutted by the finger.

13. A batch conveying unit for a unit for converting at least one plate-like element, comprising:
at least a first and a second transport device adjacent and extending parallel to one another in a longitudinal direction and each of the transport devices being configured for transporting a respective batch of at least one plate like element in the longitudinal direction;
a drive located and configured for driving the transport devices in the longitudinal direction; and
an actuating device configured and operable for coupling and decoupling the second transport device relative to the first transport device so as to selectively transport first ones of the batches separately from second ones of the batches wherein the first transport device is configured for driving the first ones of the batches in the longitudinal direction and to leave the second ones of the batches which are with the second transport device substantially immobile longitudinally when the second transport device is decoupled from the first transport device,
wherein each of the transport devices comprises an element located and configured for lifting laterally the transported batch.

* * * * *